United States Patent [19]
Ishiwatari et al.

[11] Patent Number: 5,239,386
[45] Date of Patent: Aug. 24, 1993

[54] COMMUNICATION APPARATUS USED WITH A CARD-LIKE DEVICE

[75] Inventors: Masumi Ishiwatari, Zushi; Tsuyoshi Kawanabe, Yokohama, both of Japan

[73] Assignee: Canon Kabushiki Kaisha, Tokyo, Japan

[21] Appl. No.: 601,421

[22] Filed: Oct. 23, 1990

[30] Foreign Application Priority Data
Nov. 1, 1989 [JP] Japan ................................ 1-286056

[51] Int. Cl.⁵ .............................................. H04N 1/32
[52] U.S. Cl. .................................... 358/440; 358/435
[58] Field of Search ................... 358/440, 434–436, 358/402

[56] References Cited
U.S. PATENT DOCUMENTS

| | | | |
|---|---|---|---|
| 4,136,261 | 1/1979 | Wada | 358/440 |
| 4,317,136 | 2/1982 | Keyt et al. | 358/440 |
| 4,811,111 | 3/1989 | Kurokawa | 358/440 |
| 4,994,926 | 2/1991 | Gordon et al. | 358/435 |

Primary Examiner—Stephen Brinich
Attorney, Agent, or Firm—Fitzpatrick, Cella, Harper & Scinto

[57] ABSTRACT

A communication apparatus performs communication upon receiving a dial number to be called, a transmitter's name and the like from a portable device. The communication apparatus stores received transmitters' names and the like, and prints out all the stored data later on.

25 Claims, 14 Drawing Sheets

| 12-1 | 12-2 | 12-3 | 12-4 |
|---|---|---|---|
| 03-112-1234 | ABC MARKETING | K.YAMAMOTO | 7-22 10:41 |
| 03-333-9988 | VA PLANNING | | 7-22 11:02 |
| 03-414-5151 | BWA MARKETING | | 7-22 11:17 |
| 045-111-9111 | TAT COMMUNICATION | K.YAMAMOTO | 7-22 11:21 |
| 03-112-1234 | ABC MARKETING | M.SUZUKI | 7-22 11:36 |
| 03-716-7111 | DDF MARKETING | H.KIMURA | 7-22 14:41 |
| 044-726-8111 | ATT ADVERTISING | O.WATANABE | 7-22 16:19 |
| 0299-21-5211 | AW COMMUNICATION | M.SUZUKI | 7-22 18:54 |
| 03-414-5151 | BWA MARKETING | K.YAMAMOTO | 7-22 19:07 |
| 045-212-3221 | YKT MARKETING | | 7-23 9:57 |
| 03-333-9988 | VA PLANNING | A.TAKAHASHI | 7-23 10:25 |
| 045-111-9111 | TAT COMMUNICATION | | 7-23 10:43 |
| 03-112-1234 | ABC MARKETING | K.YAMAMOTO | 7-23 11:16 |
| 044-375-6213 | YYC PLANNING | K.YAMADA | 7-23 13:05 |

FIG. 12

| | | | | 13-5 |
|---|---|---|---|---|
| ADMINISTRATION REPORT | | | 7-23 | 14:22 |
| K. YAMAMOTO | 03-112-1234 | ABC MARKETING | 7-22 | 10:41 |
| K. YAMAMOTO | 045-111-9111 | TAT COMMUNICATION | 7-22 | 11:21 |
| K. YAMAMOTO | 03-414-5151 | BWA MARKETING | 7-22 | 19:07 |
| K. YAMAMOTO | 03-112-1234 | ABC MARKETING | 7-23 | 11:16 |
| 13-1 | 13-2 | 13-3 | 13-4 | |

FIG. 13

| | | | | 14-5 |
|---|---|---|---|---|
| ADMINISTRATION REPORT | | 7-23 | 14:30 | |
| 03-112-1234 | ABC MARKETING | K. YAMAMOTO | 7-22 | 10:41 |
| 03-112-1234 | ABC MARKETING | M. SUZUKI | 7-22 | 11:36 |
| 03-112-1234 | ABC MARKETING | K. YAMAMOTO | 7-23 | 11:16 |
| 14-1 | 14-2 | 14-3 | 14-4 | |

FIG. 14

|  | ADMINISTRATION REPORT |  | 7-23 | 14:33 | 15-5 |
|---|---|---|---|---|---|
| 03-716-7111 | DDF MARKETING | H. KIMURA | 7-22 | 14:41 |
| 044-726-8111 | ATT ADVERTISING | O. WATANABE | 7-22 | 16:19 |
| 0299-21-5211 | AW COMMUNICATION | M. SUZUKI | 7-22 | 18:54 |
| 03-414-5151 | BWA MARKETING | K. YAMAMOTO | 7-22 | 19:07 |

COMMUNICATION APPARATUS USED WITH A CARD-LIKE DEVICE

BACKGROUND OF THE INVENTION

1. Field of the Invention

This invention relates to a communication apparatus which receives data from a portable device and performs communication in accordance with the received data.

2. Description of the Related Art

A conventional facsimile (FAX) can store several telephone numbers and automatically call a telephone number composed of about ten digits using a single button or an abbreviated number. In some cases, times of calling and called stations are stored, and admistration reports are printed out.

Furthermore, calling from a FAX using data registered in a small electronic device having telephone numbers and the like, that is, a so-called electronic data memo (an electronic telephone directory) has become possible.

When calling is performed according to data received from the electronic data memo, however, even when time of calling and the called station are recorded in an administration report, the caller cannot be identified.

SUMMARY OF THE INVENTION

It is an object of the present invention to improve a communication apparatus.

It is another object of the present invention to more strictly perform administration in communication when communication is performed according to communication data received from a portable device.

It is still another object of the present invention to provide a communication apparatus capable of outputting all users' names when the communication apparatus is used with a portable device.

These and other objects of the present invention will become more apparent from the description of the preferred embodiments.

DETAILED DESCRIPTION OF THE PREFERRED EMBODIMENTS

First Embodiment

Figure 4:
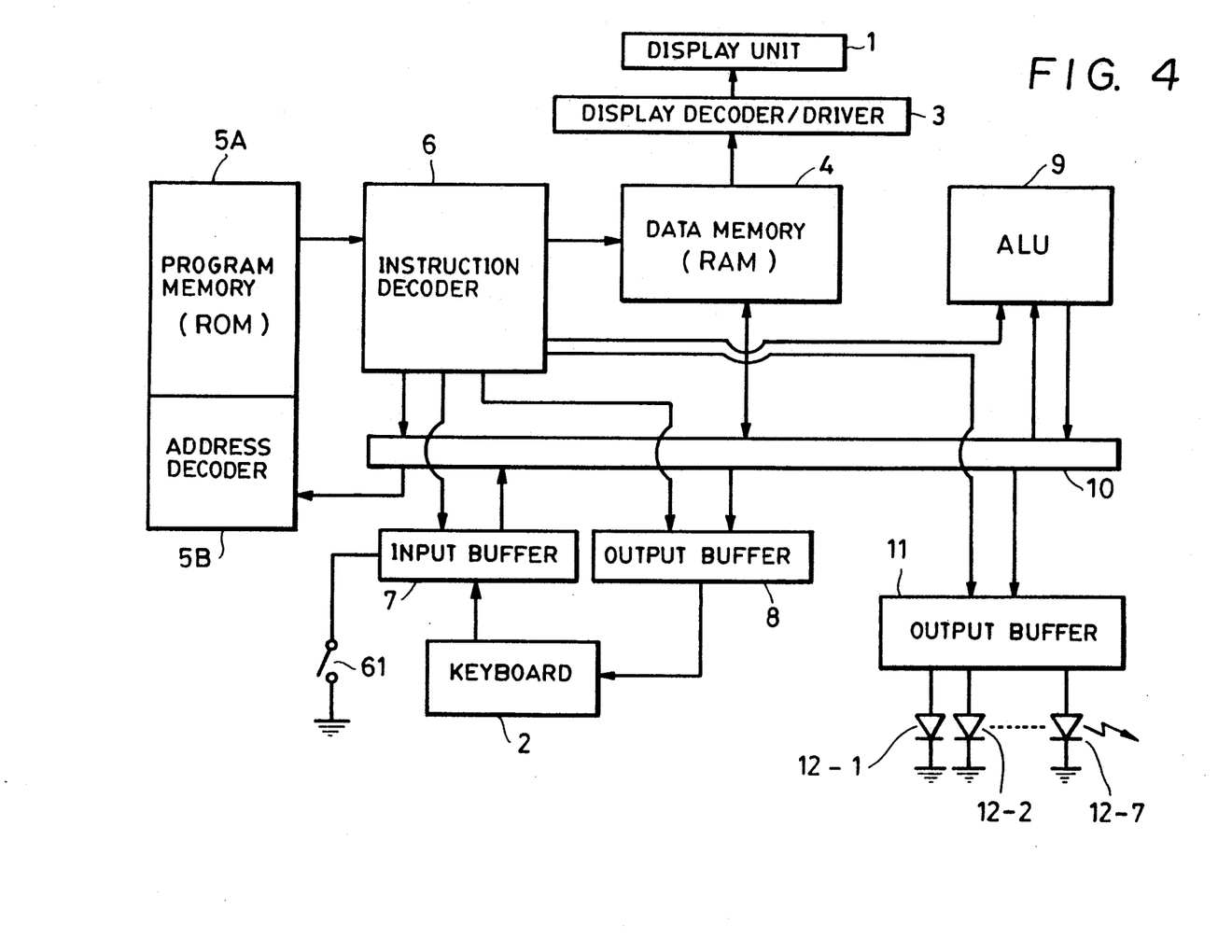
FIG. 4 is a block diagram of an electronic data memo according to the first embodiment.

FIG. 4 is a block diagram showing the configuration of an electronic data memo (an electronic telephone directory) 30 having the size of a credit card according to the present invention. A program memory 5A composed of a ROM (read-only memory) stores process procedures, which will be described later. An instruction stored in an address assigned by an address decoder 5B is decoded by an instruction decoder 6, and controls respective units in synchronization with a predetermined timing clock. For example, data stored in a RAM 4 are transmitted to a display decoder/driver 3, which drives a display unit 1 to display the data. If any key switch on a keyboard 2 has been operated, a signal from the operated key is taken in from an input buffer 7, and processing corresponding to the operated key is executed according to a process procedure stored in the ROM 5A. Dial data stored in the RAM 4 are transmitted to an output buffer 11 via data bus 10. The output buffer 11 drives LEDs (light-emitting diodes) 12-1–12-7 to convert the data into optical signals, which are transmitted to the outside.

Figure 5:
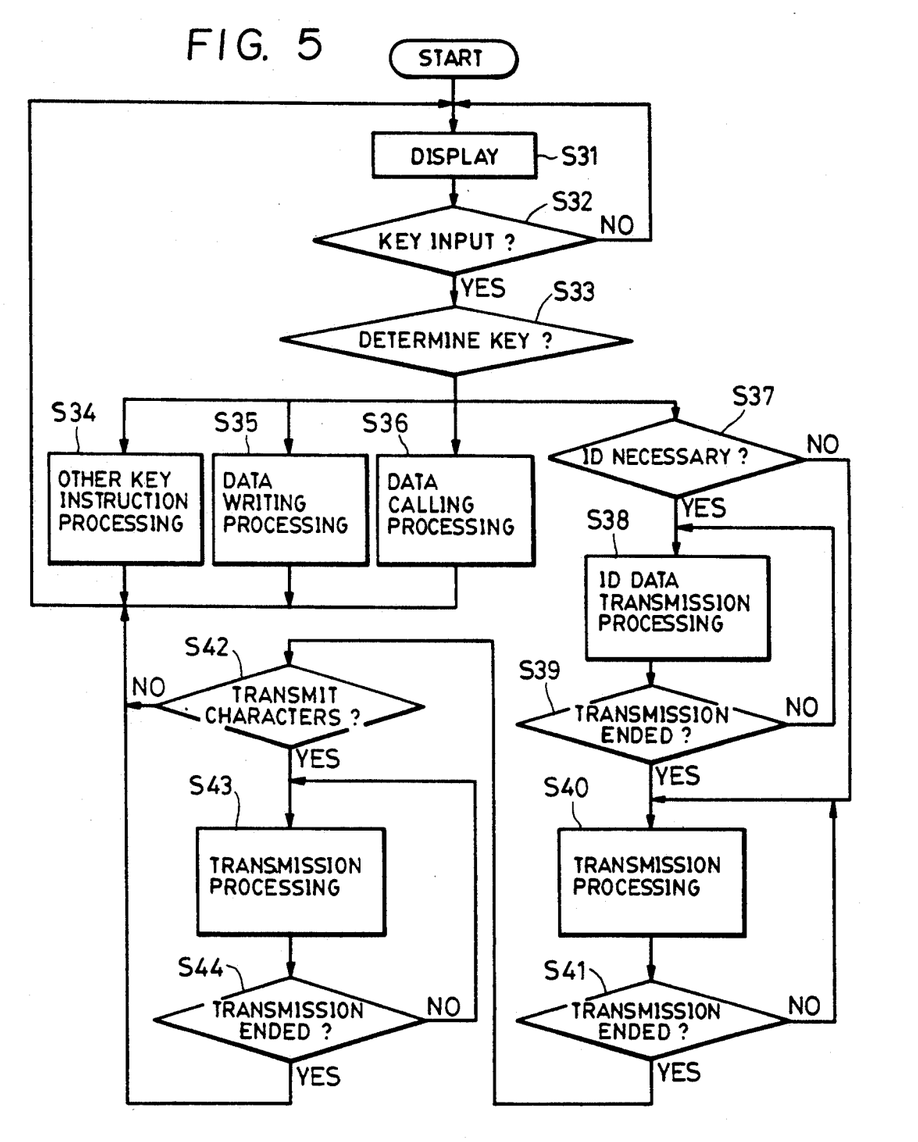
FIG. 5 is a flowchart showing a procedure of various operations for a card according to the first embodiment.

FIG. 5 shows a transmission process procedure for a telephone number by the electronic data memo 30 shown in FIG. 4. At step S31, the instruction decoder 6 displays data stored in the RAM 4 as display data, during a display process. The instruction decoder 6 then determines whether or not there is a key input at key determination step S32. If the determination result is "No.", the process returns to step S31. When the instruction decoder 6 has determined that there was a key input at step S32, the process proceeds to step S33, where the instruction decoder 6 determines what kind of process the input key requests.

Figure 6:
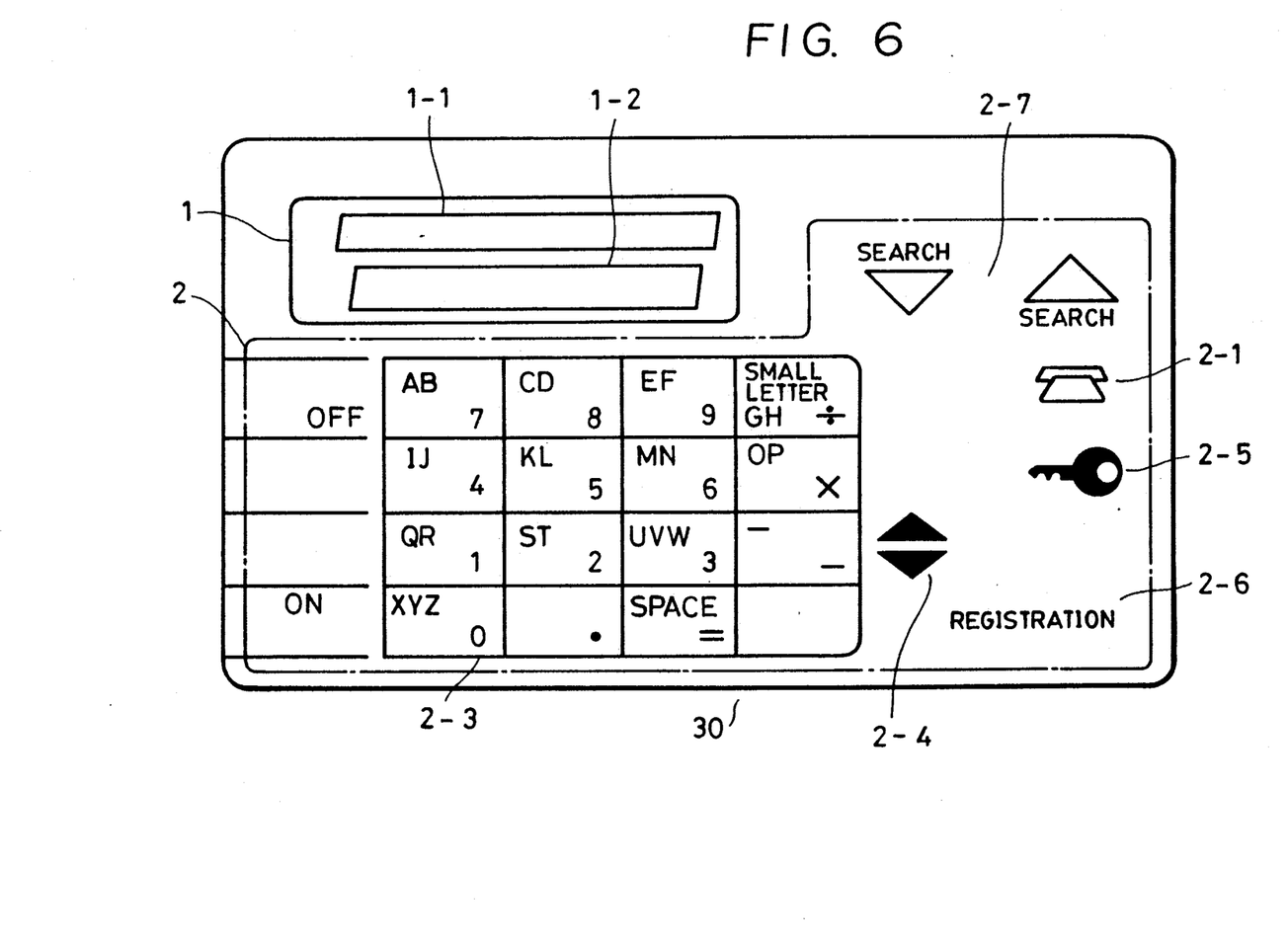
FIG. 6 is a front view of a card of the first embodiment.

For example, in a telephone mode, the data of the correspondent's name are input to a character data display unit 1-1 using character keys 2-3 shown in FIG. 6. For inputting the data of the dial number of the correspondent, a cursor is moved to a numerical data display unit 1-2 using a cursor moving key 2-4 to provide a state to input a numerical value, and numerical-value data are then input using the character keys 2-3. For inputting ID (identification) data indicating the caller (the owner of the electronic card memo), a secret registration key 2-5 is depressed to provide a state to input ID data, and the data of the name and number are input in the same manner as described above. These operations correspond to the other key instruction processing at step S34. That is, the instruction decoder 6 writes a character code in a display area in the RAM 4 in accordance with the operation of the keyboard 2. At step S31, the display decoder/driver 3 performs bit expansion on the character code written in the display area in the RAM 4 in accordance with an instruction from the instruction decoder 6, and displays the result on the display unit 1.

When a registration key 2-6 has been depressed, the instruction decoder 6 transfers the character codes for the name and dial number in the display area in the RAM 4 to a registration area in the RAM 4.

When a data calling process at step S36 has been instructed using the character keys 2-3 and a search key 2-7, the instruction decoder 6 transfers data corresponding to depressed character keys 2-3 or the depressed search key 2-7 from the registration area to the display area in the RAM 4, and displays the data on the display unit 1.

When performing a calling operation using a dial number previously registered in the electronic data memo 30, the user sets the electronic data memo 30 on an operation panel in a communication apparatus (to be described later), and then depresses a dial start key 2-1.

When the instruction decoder 6 has determined that the dial start key 2-1 was depressed to provide a dial number transmission process, the instruction decoder 6 determines whether or not a switch 61 is switched on. If the determination result is "Yes", previously-registered ID data are transmitted at step S38. If the result of determination is "No", the process proceeds to step S40 (to be described later) without outputting the ID data.

After transmitting the one-digit ID data at step S38, the instruction decoder 6 determines whether or not the data to be transmitted has been transmitted, at step S39. If the determination result is "No", the process returns to step S38, where the next data are transmitted. This process is repeated until the determination result at step S39 becomes "Yes".

Figure 7:
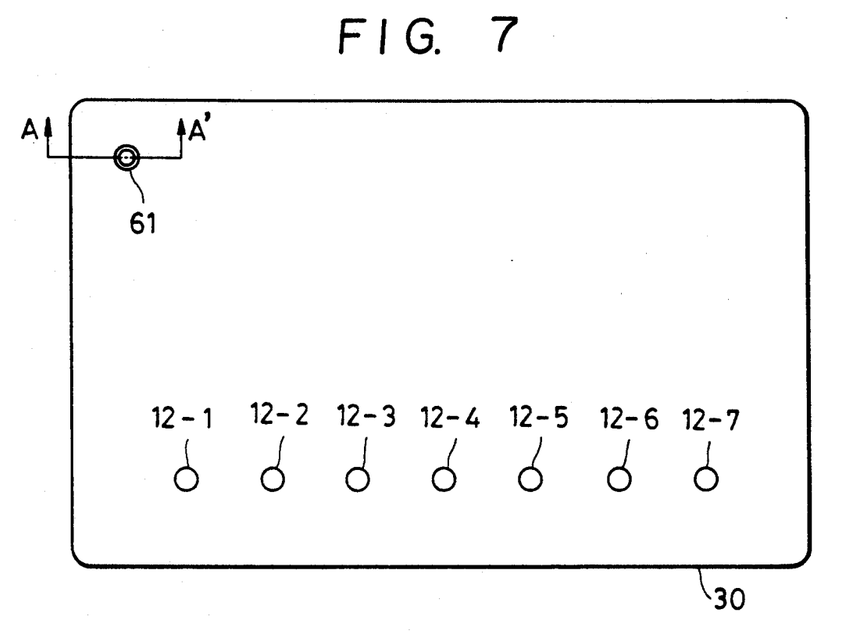
FIG. 7 is a rear view of the card of the first embodiment.

As described above, in the present embodiment, determination processing as to whether or not a communication apparatus of the correspondent is a terminal apparatus requiring ID data is performed according to the switch 61 shown in FIG. 7. That is, when ID data are needed, a projection may be provided on the communication apparatus at a position corresponding to the position of the switch 61. In another way, ID data may be transmitted from the electronic card memo 30 irrespective of the kind of a terminal apparatus, which may neglect the received ID card if it does not need the ID data.

If the determination result is "Yes" at step S39, the data of the dial number to be called (the telephone-number data, such as the telephone number and the like called on the display 1-2 at step S36) are transmitted at the next step S40. The instruction decoder 6 determines whether or not the data to be transmitted have been transmitted at step S41. If the determination result is "No", the process returns to step S40, where the next data are transmitted. This process is repeated until the determination result at step S41 becomes "Yes".

Next, the instruction decoder 6 determines whether or not data (the address and the like), such as characters and the like, are registered in correspondence with the called number. If the determination result is "No", the process returns to step S31. If the determination result is "Yes", character data to be transmitted are subjected to code conversion according to a previously-determined code table and the resultant code is transmitted after a delimiting code relative to numerical data (step S43). This process is repeated until transmission of the data has been ended at step S44.

Figure 8:
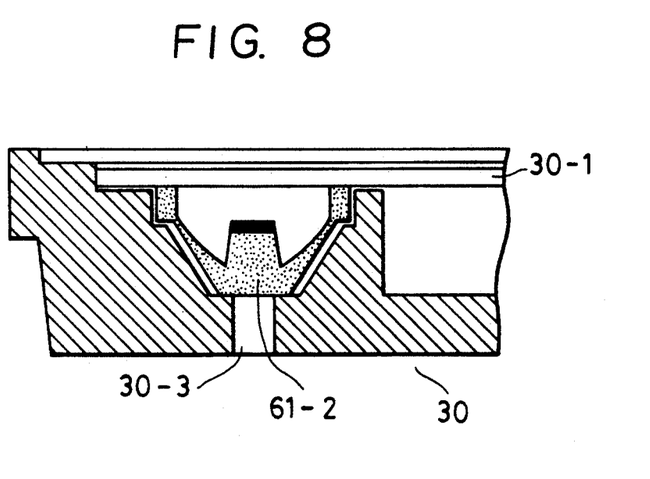
FIG. 8 is a cross-sectional view of the structure of a detection switch according to the first embodiment.

FIG. 8 is a cross-sectional view taken on line A—A' of the switch 61 shown in FIG. 7. A rubber switch 61-2 is depressed by a projection provided on a FAX (facsimile) or a telephone set via a hole 30-3 provided in a main body 30 to switch on a pattern (not shown) provided on a printed circuit board 30-1. Accordingly, whether or not ID data are needed can be determined.

Figure 2:
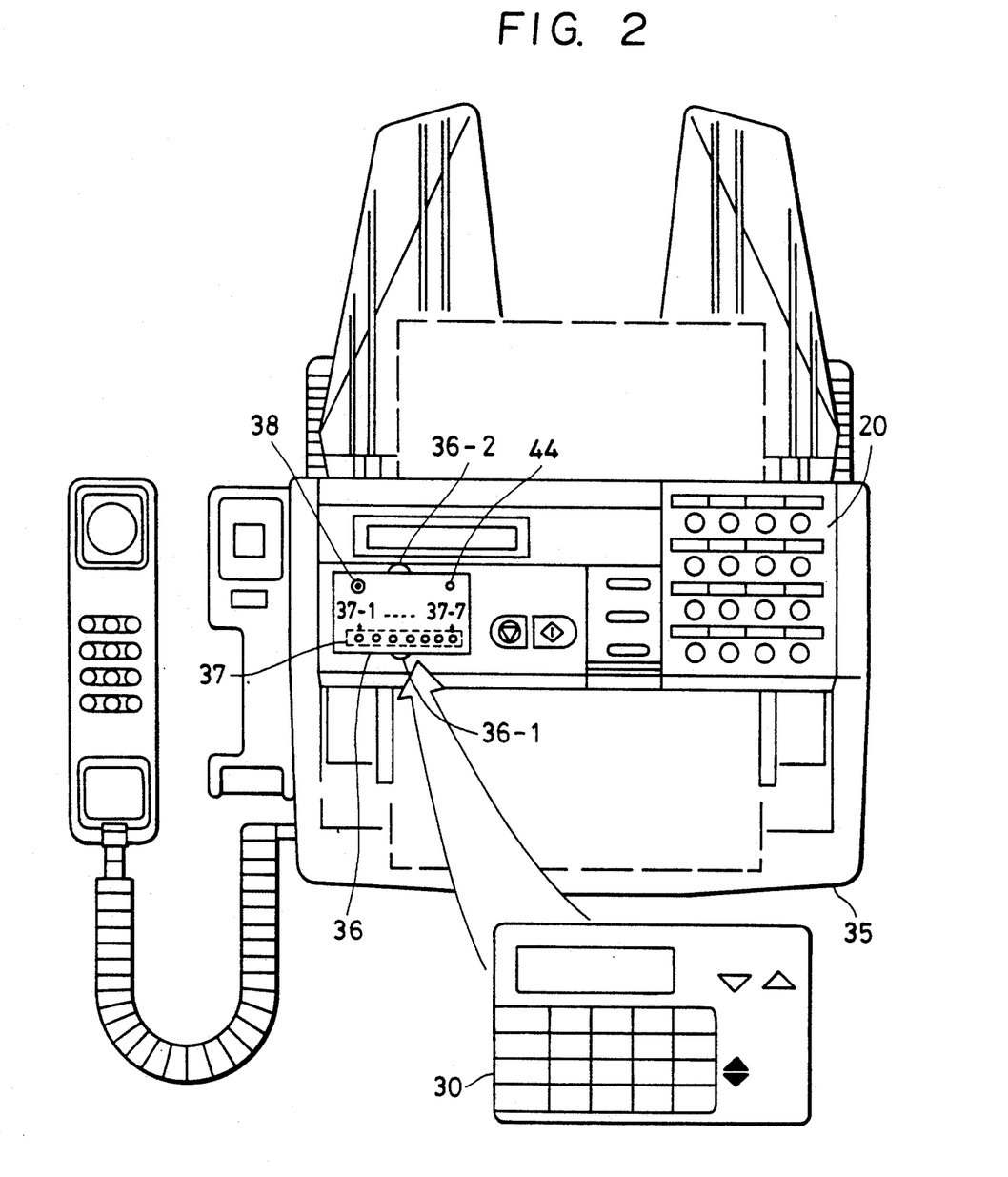
FIG. 2 is a top plan view of the facsimile of the first embodiment.

FIG. 2 shows a FAX 35 which performs a calling operation and transmission of image and sentences on the basis of dial number, name and ID data received from the electronic data memo 30. A recess 36 is provided in the main body of the FAX 35 in order to position and fix the electronic data memo 30. Concave portions 36-1 and 36-2 are provided on a part of the circumference of the recess 36 so that the electronic data memo 30 can be easily set and removed. Photosensors 37-1-37-7 receive optical signals from the electronic data memo 30. A switch 38 detects whether or not the electronic data memo 30 is set. A projection 44 notifies the electronic data memo 30 that ID data are needed.

Figure 1:
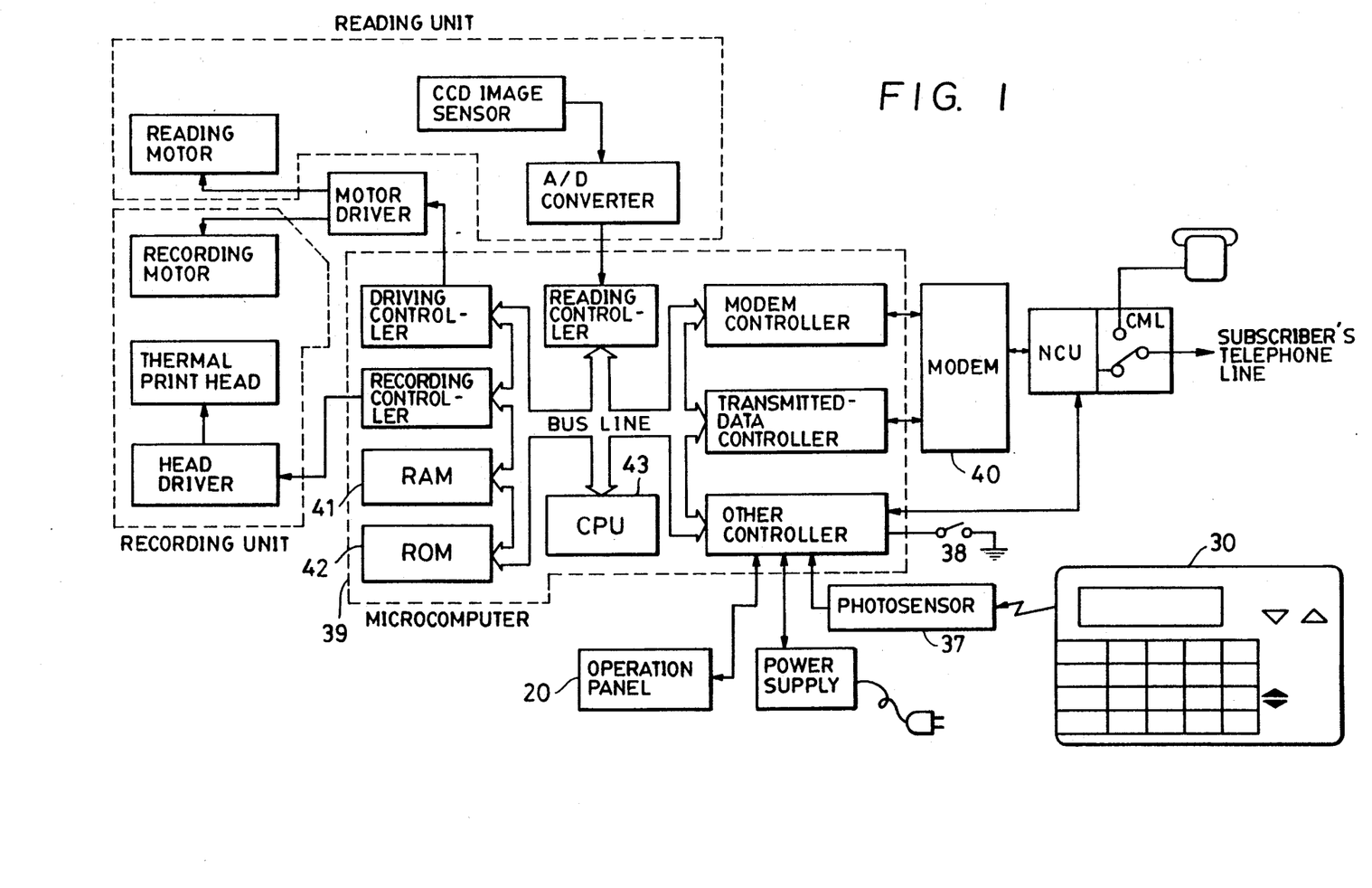
FIG. 1 is a block diagram of a facsimile according to a first embodiment of the present invention.

FIG. 1 is a block diagram showing the configuration of the FAX 35. A CPU 43 detects by the switch 38 that the electronic data memo 30 has been set. The photosensor unit 37 (37-1-37-7) performs photoelectric conversion of the optical signals transmitted from the electronic data memo 30. The CPU 43 controls a modem 40 to perform a calling operation according to the data received by the photosensor unit 30. The CPU 43 also demodulates coded addresses and data of senders' names in ID data into bit images in a memory (RAM) 41 and stores the bit images. Image data input from a reading unit are also stored in the memory (RAM) 41 and are transmitted via the modem 40.

Figure 9:
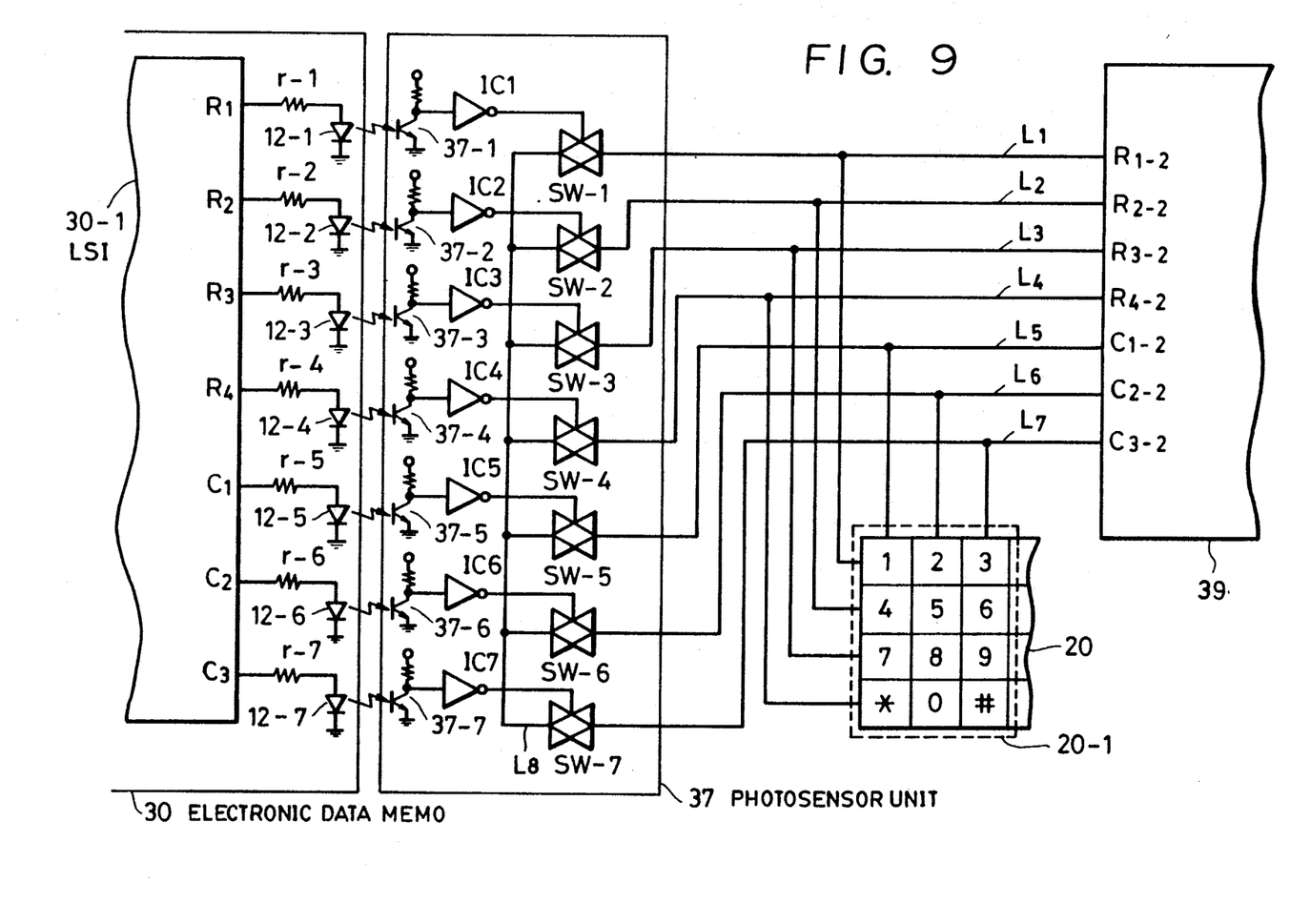
FIG. 9 is a logic diagram of a signal transmitting and receiving (photocoupling) unit according to the first embodiment.

FIG. 9 is a logic diagram for the emission output unit 12 in the electronic data memo 30, the photosensor unit 37 in the FAX 35, and a microcomputer 39. An LSI 30-1 for the electronic data memo 30 has the configuration as explained in FIG. 4, and has output terminals $R_1$, $R_2$, $R_3$, $R_4$, $C_1$, $C_2$ and $C_3$ for outputting optical signals. Respective outputs are connected to the light-emitting diodes 12-1-12-7 through current-limiting resistors r-1-r-7.

Figure 10:
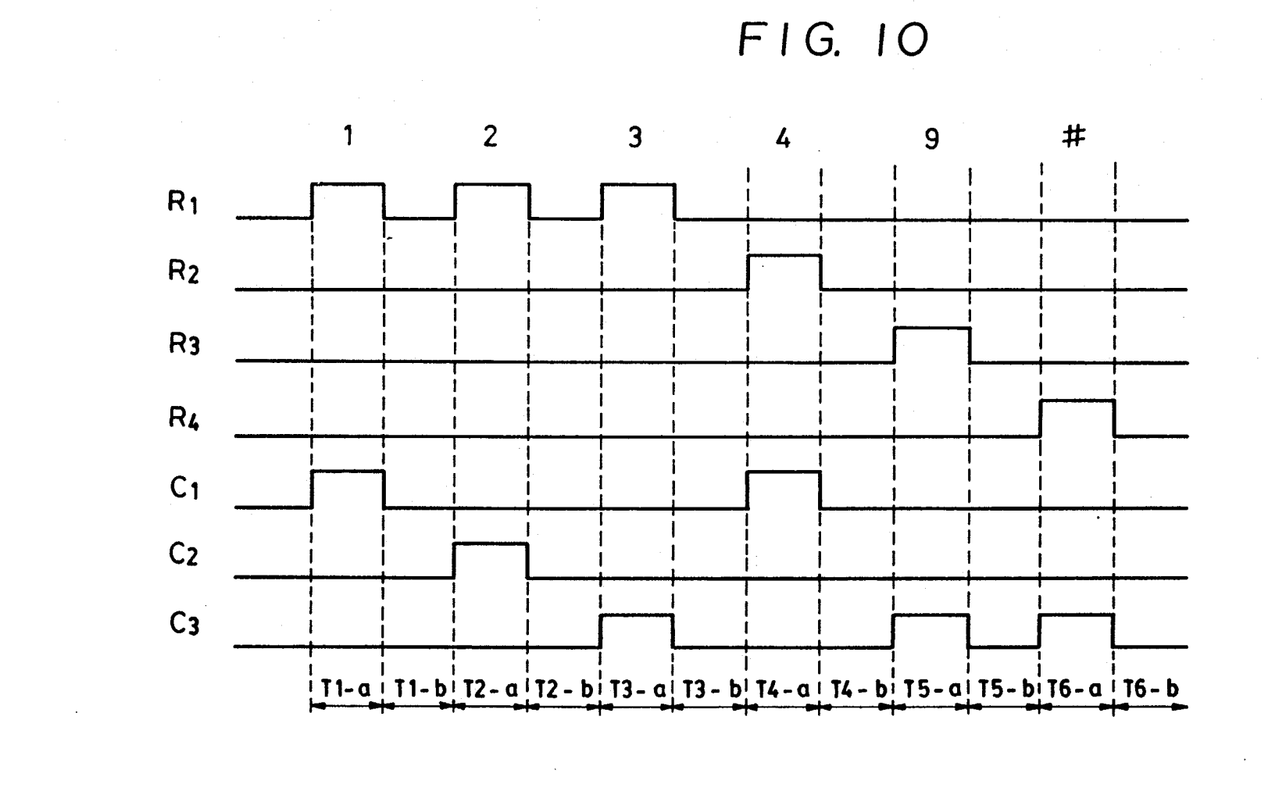
FIG. 10 is a 2-of-7 timing chart according to the first embodiment.

The operation when data "1, 2, 3, 4, 9, #" are transmitted will now be explained by reference to the timing chart shown in FIG. 10.

For transmitting data "1", so-called 2-to-7system signals are output. That is, signals "1" and "0" are output from the output terminals $R_1$ and $C_1$ and from the other output terminals, respectively, for a period T1-a. According to these outputs, currents flow in the LEDs 12-1 and 12-5, which emit light. The other LEDs do not emit light. Only the photodetectors 37-1 and 37-5, such as phototransistors or the like, which receive the light, are turned on. Outputs "1" are supplied to analog switches SW-1 and SW-5 via inverters IC1 and IC5 connected next to the photodetectors 37-1 and 37-5, respectively. Only these two switches are switched on.

Line $l_1$ connected to the analog switch SW-1 and line $l_5$ connected to the analog switch SW-5 are thereby connected to line $l_8$. As a result, lines $l_1$ and $l_5$ are connected together. The above-described operation provides the same state as when key "1" in a dial key 20-1 on an operation panel 20 is depressed to connect together lines $l_1$ and $l_5$. Data "1" is thereby input to the microcomputer 39.

For the next period T1-b, all outputs from the LSI 30-1 become "0". Thus, the phototransistors 12-1-12-7 are turned off, outputs from the IC-IC7 are "0", and analog switches SW-1-SW-7 are switched off. Hence, each of lines $l_1-l_7$ enters an open state and is not connected to any line. This is the same state as when key "1" in the dial key 20-1 is disconnected.

Similarly, for transmitting data "2", outputs from $R_1$ and $C_2$ connect together lines $l_1$ and $l_6$ for a period T2-a. For transmitting data "3", outputs from $R_1$ and $C_3$ connect together lines $l_1$ and $l_7$ for a period T3-a. Further, outputs from $R_2$ and $C_1$, $R_3$ and $C_3$, and $R_4$ and $C_3$ connect together lines $l_2$ and $l_5$, and $l_3$ and $l_7$, and $l_4$ and $l_7$ for periods T4-a, T5-a and T6-a, respectively. Thus, data "1, 2, 3, 4, 9, #" are input to the microcomputer 39.

Figure 3:
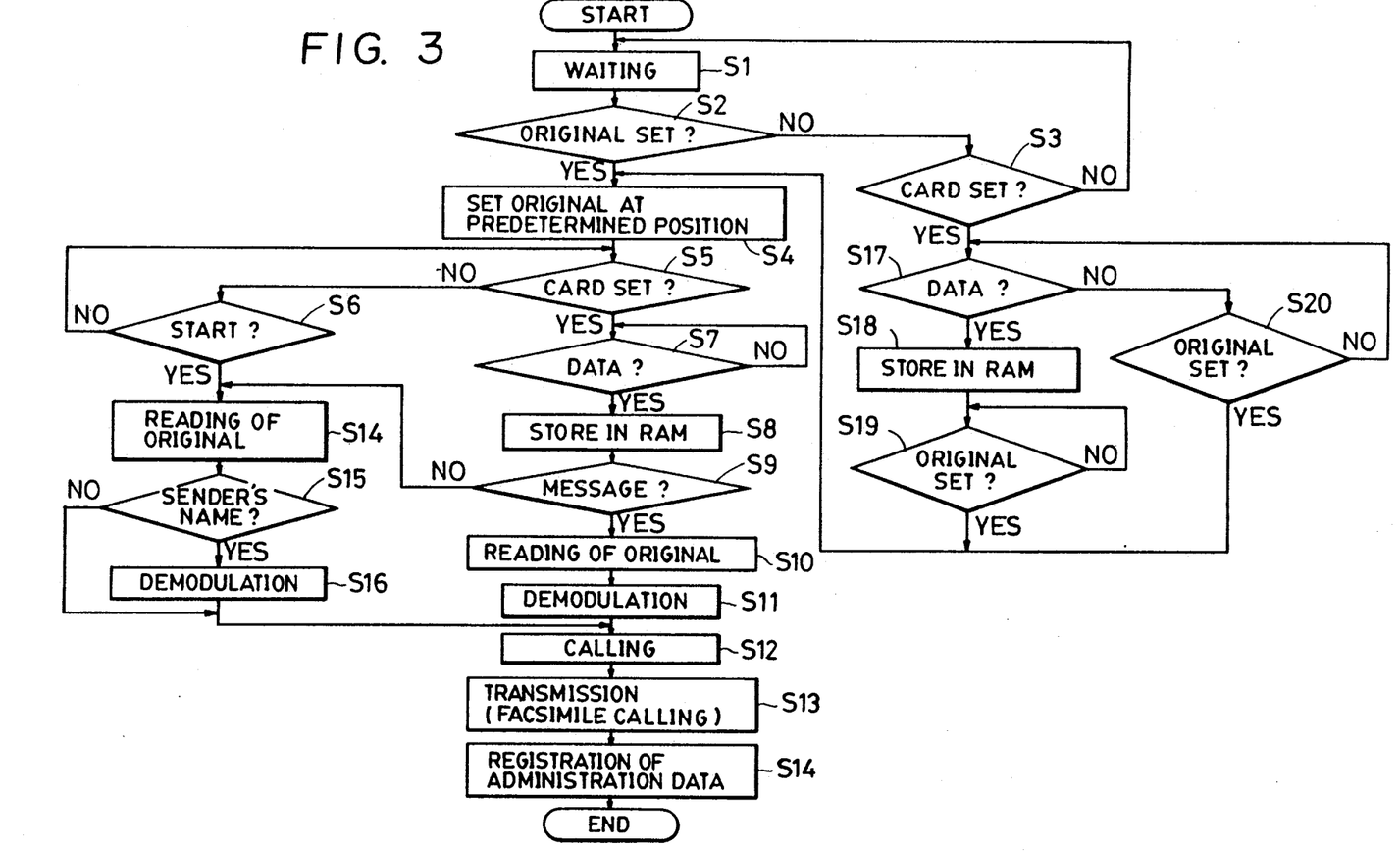
FIG. 3 is a flowchart of the operation of the facsimile of the first embodiment.

FIG. 3 shows data storage processing for calling, address writing and administration reports using data which the host apparatus (FAX) in the present system has received from the electronic data memo.

The CPU 43 in a waiting state at step S1 waits until an original for FAX transmission is set (step S2), or the electronic data memo (card) 30 is set (step S3). If the result at determination step S2 is "Yes", that is, if the original for FAX transmission has been set on a reading unit, each sheet of the original is separated even if the original is composed of several sheets, and the first sheet is set at a predetermined position (step S4). The process is in a waiting state until the card 30 is set at determination step S5, or an one-touch dial button or the like on the operational panel 20 is operated to perform a transmission instruction at step S6.

If printout of administration data (to be described later) has been instructed during the waiting operation, the administration data are printed out.

When the card 30 has been set, the switch 38 is switched on. The determination result at step S5 becomes "Yes" according to a signal from the switch 38, and the CPU 43 enters a state of waiting for data from the card 30 at step S7. If the dial start key 2-1 in the card 30 has been depressed, and data have been transmitted from the LED 12, the CPU 43 stores the data subjected to photoelectric conversion by the photosensor unit 37 in the memory (RAM) 41 (step S8).

As described above, in the present embodiment, since data are received in the form of light from the electronic card 30, misoperation due to external light is prevented by neglecting the result of detection by the photosensor unit 37 until the electronic card 30 is set.

The CPU 43 then determines whether or not there is a message sentence in the received data, that is, whether or not data have been transmitted succeeding a message code (for example, "#1#" or the like) after the dial-number data (step S9). If the determination result is "Yes", the first sheet or several sheets of the original for FAX transmission are read by the reading unit, and the read data are stored as bit images in the memory (RAM) 41 (step S10). Subsequently, the CPU 43 demodulates the above-described message sentence, such as addresses, data of senders' names in ID data or the like, into bit images, synthesizes the bit images in a leading portion of image data of the original input from the reading unit and stored in the memory RAM 41, and stores the resultant data (step S11). The modem 40 is then driven according to the dial-number data stored at step S8 and a calling operation is performed (step S12). Subsequently, message communication, so-called facsimile calling, with the correspondent (the called side) is performed (step S13), and conditions for data transmission are determined. An image of the original for FAX transmission, to which the address and the sender's name from the card is added, is then read from the RAM 41, and transmission is performed in accordance with the previously-decided conditions for data transmission.

Administration data, such as the caller's name, the dial number and the abbreviated name of the correspondent, time of transmission, the number of transmitted sheets, occurrence of errors, or the like, are then registered in the RAM 41 (step S14).

If card ID data which are not registered has been set and hence the determination result at step S9 is "No", the CPU 43 reads the original for FAX transmission as in step S10, and stores read data in the memory (RAM) 41 as bit images (step S14). The CPU 43 then determines whether or not the data of the sender's name and the like are preset in the main body of the FAX, that is, whether or not the data of the company's name, department's name and the like, where the FAX is installed, are registered in the RAM 41 (step S15). If the determination result is "Yes", the CPU 34 demodulates the data into bit images as in step S11, synthesizes the bit images in a leading portion of the image data stored in the RAM 41 at step S14, and stores the resultant data (step S16). Subsequently, the process proceeds to step S12, where the CPU 43 performs a calling operation according to the dial-number data stored at step S8 to transmit the original for the facsimile (in this case, the CPU 43 synthesizes data of the sender's name previously registered in the RAM 41 and transmits the resultant data). Administration data for the above-described operation are dealt with as in the case of manual transmission from the operation panel 20. That is, the CPU 43 registers the administration data in the RAM 41 separate from administration data from the electronic card memo.

When the determination result at step S9 is "No", it may be arranged so that the case is dealt with as an error and the FAX is not operated. If transmission is thus prohibited when the transmitter cannot be identified, it is possible to strictly administrate the use of the FAX.

If the determination result is "No" at step S2 and is "Yes" at the next step S3, that is, if only the card 30 is set and the original for FAX transmission is not set, data from the card 30 are waited for at step S17. If the determination result at step S17 becomes "Yes", the data are stored in the memory (RAM) 41 (step S18). At step S19, waiting is performed until the original for FAX transmission is set. If the determination result at step S19 becomes "Yes", the process proceeds to the above-described step S4, where the same processing as that described above is performed. Even if the determination result at step S17 is "No", waiting is performed at step S20 until the original for FAX transmission is set ("Yes"). If the determination result at step S20 becomes "Yes", the process proceeds to step S4 as described above, where the same processing as that described above is performed.

Although, in the above-described case, waiting is performed at steps S19 and S20 until the original for FAX transmission is set in the above-described case, a timer processing step may be added after "No" results at these determination steps, and warning or the like may be issued if the original for FAX transmission has not been set for at least a predetermined time.

Figure 11:
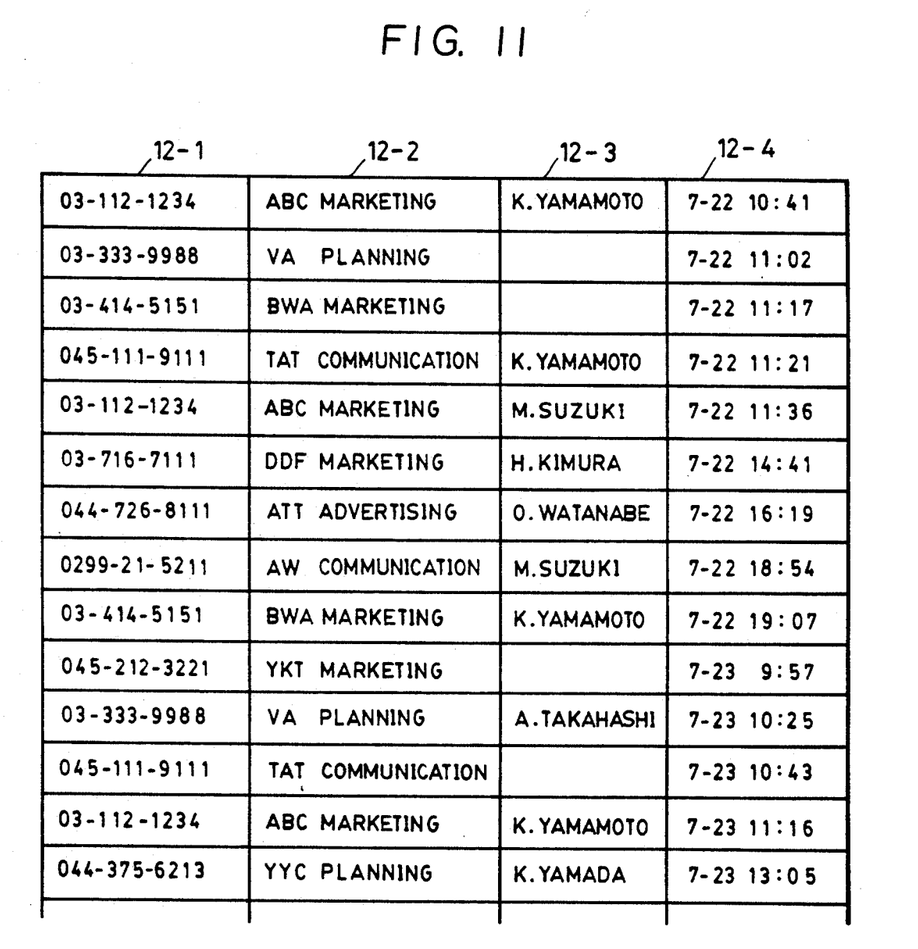
FIG. 11 is an administration data memory diagram for the facsimile of the first embodiment.

FIG. 11 shows an example of data in the RAM 41, which stores and holds the name of the owner of the card, data of dialed calls and correspondents' names, as ID data from the card 30, and data of dates and times of calling operations provided by a clock function (not shown) incorporated within the FAX 35. Column 12-1 indicates correspondents' dial numbers. Columns 12-2, 12-3 and 12-4 indicate correspondents' names, transmitters' names, and dates and times of transmission operations, respectively. Empty columns in the column 12-3 for transmitters' names indicate transmission instructions from the operation panel 20 of the facsimile or from a card in which transmitters' names are not registered.

Figure 12:
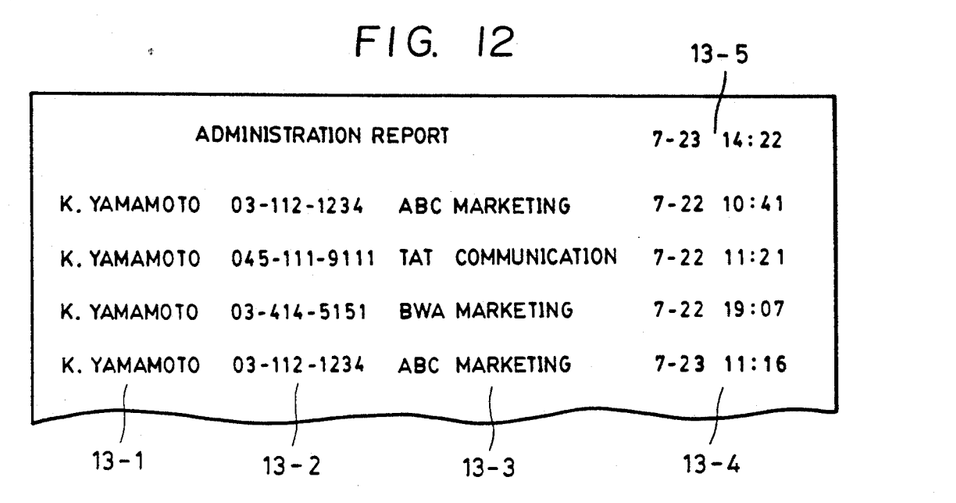
FIGS. 12–14 are output diagrams of administration reports output according to respective formats according to the first embodiment.

FIG. 12 shows an administration report provided by extracting a calling-operation history for identical transmitters according to the above-described data base, and outputting and recording the result. Columns 13-1, 13-2, 13-3 and 13-4 indicate transmitters' names, correspondents' numbers, correspondents' names, and dates and times of transmission operations, respectively. Column 13-5 indicates the date and time when the report was output. Output of the data shown in FIG. 12 is performed in accordance with an instruction from the operation panel 20 of the facsimile or the keyboard of the card 30.

Figure 13:
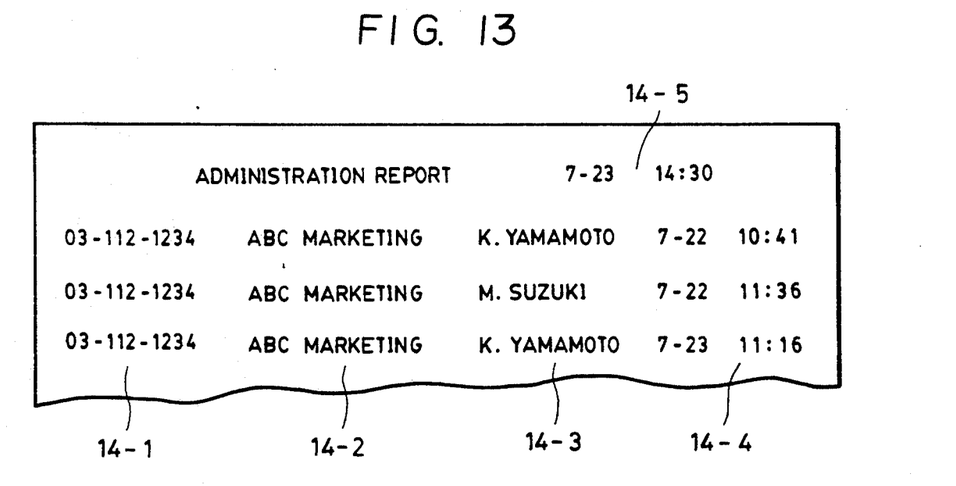

Similarly, FIG. 13 shows an administration report arranged according to identical correspondents. Columns 14-1, 14-2, 14-3 and 14-4 indicate correspondents' dial numbers, correspondents' names, transmitters names and dates and times of transmission operations, respectively. Column 14-5 indicates the date and time when the report was output.

Figure 14:
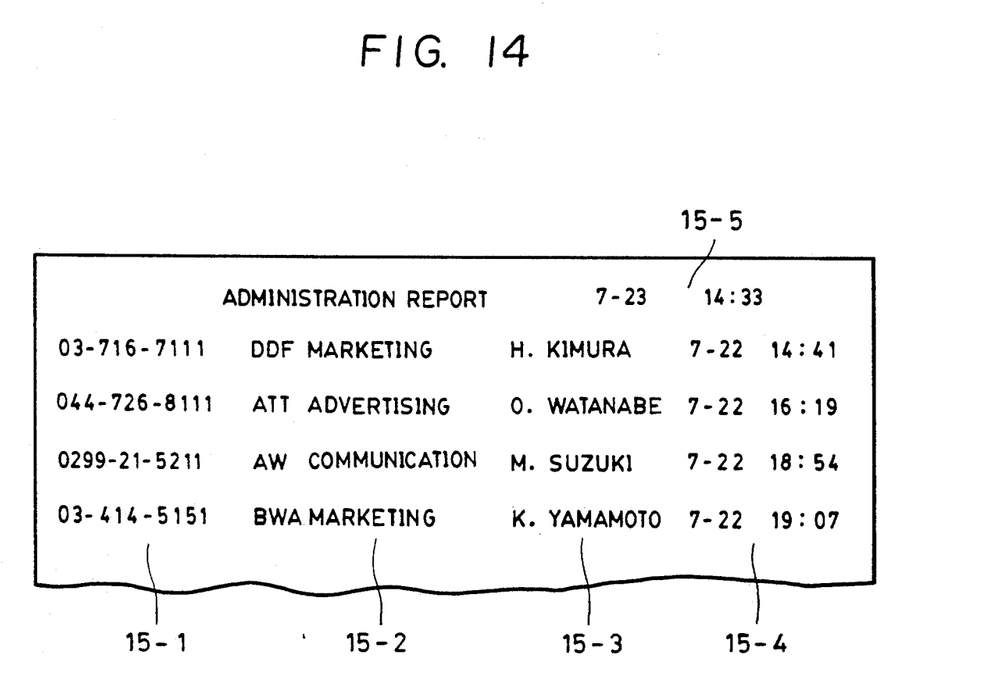

FIG. 14 shows an administration report provided by extracting a history of communication operations performed during the afternoon of the 22nd of July and outputting the result. Columns 15-1, 15-2, 15-3 and 15-4 indicate correspondents' dial numbers, correspondents' names, transmitters' names, and dates and times of transmission operations, respectively. Column 15-5 indicates the date and time when the report was output.

In the present embodiment, the facsimile 35 receives the correspondent's dial number and the caller's name (the name or code of the owner of the electronic card memo 30) from the electronic card memo 30, calls the received dial number, and stores the correspondent's dial number and the caller's name as administration information. The facsimile 35 also stores the number of transmitted sheets, time of a transmission operation read from the clock incorporated within the facsimile, and the like, as administration information. Furthermore, the facsimile 35 performs bit expansion on the received caller's name, adds the result to the original to be transmitted, and transmits the resultant data. Accordingly, it is possible to notify the correspondent of from whom the facsimile information has been transmitted.

When the correspondent's name has been transmitted from the electronic card 30, the facsimile 35 stores the correspondent's name. The facsimile 35 further performs bit expansion on the correspondent's name, adds the result to the original to be transmitted, and transmits the resultant data.

Although, in the present embodiment, the owner's name peculiar to the electronic card memo is transmitted from the electronic card memo as the caller's name, a plurality of owners' names may be registered in the electronic card memo, and a particular name may be selected by a key when performing a calling operation.

As explained above, even if different people use a facsimile in common, it is possible to perform a transmission operation not using a fixed address and sender's name registered in the facsimile, but using the name of a particular person or the like registered in the electronic data memo. Accordingly, it is not necessary to write a message sentence at the head of a sentence every time, and hence to reduce clerical work when transmitting facsimile messages.

Furthermore, since information relative to who performed a transmission operation, to where and at what time is registered, it is possible to catch who frequently utilizes the FAX, communication operations with which correspondents are frequent, and the like by printing the information. Moreover, it becomes possible to perform administration for respective departments if codes for respective departments or the like for the owners of cards are added to ID data.

Second Embodiment

Figure 15:
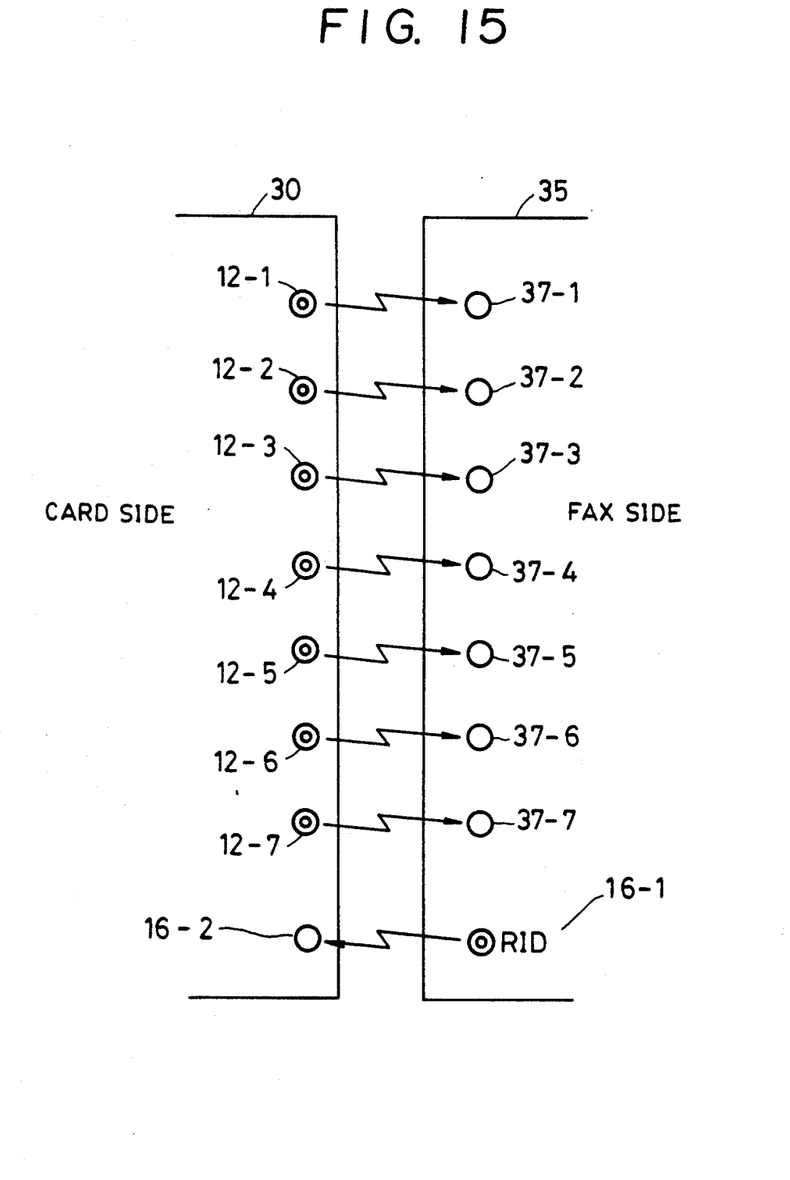
FIG. 15 is a logic diagram showing a card detecting unit according to a second embodiment.

FIG. 15 is a diagram for explaining the function of an optical signal transmitting and receiving unit which communicates whether or not it is necessary to transmit ID data by providing an optical-signal receiving unit 16-2 at the side of the card 30 and an optical-signal outputting unit 16-1 for requesting ID data to the card 30 at the side of a terminal apparatus, such as the FAX 35 or the like. At the side of the card 30 are provided LEDs 12-1–12-7, serving as an optical-signal outputting unit, as in FIG. 9, and an optical signal receiving unit 16-2 composed of a phototransistor or the like, for receiving a signal for notifying whether or not ID data are needed. At the side of the FAX 35 are provided seven photosensing units 37-1–37-7 corresponding to the LEDs 12-1–12-7, respectively, and an optical-signal LED (RID) 16-1 for requesting transmission of ID data.

Figure 16:
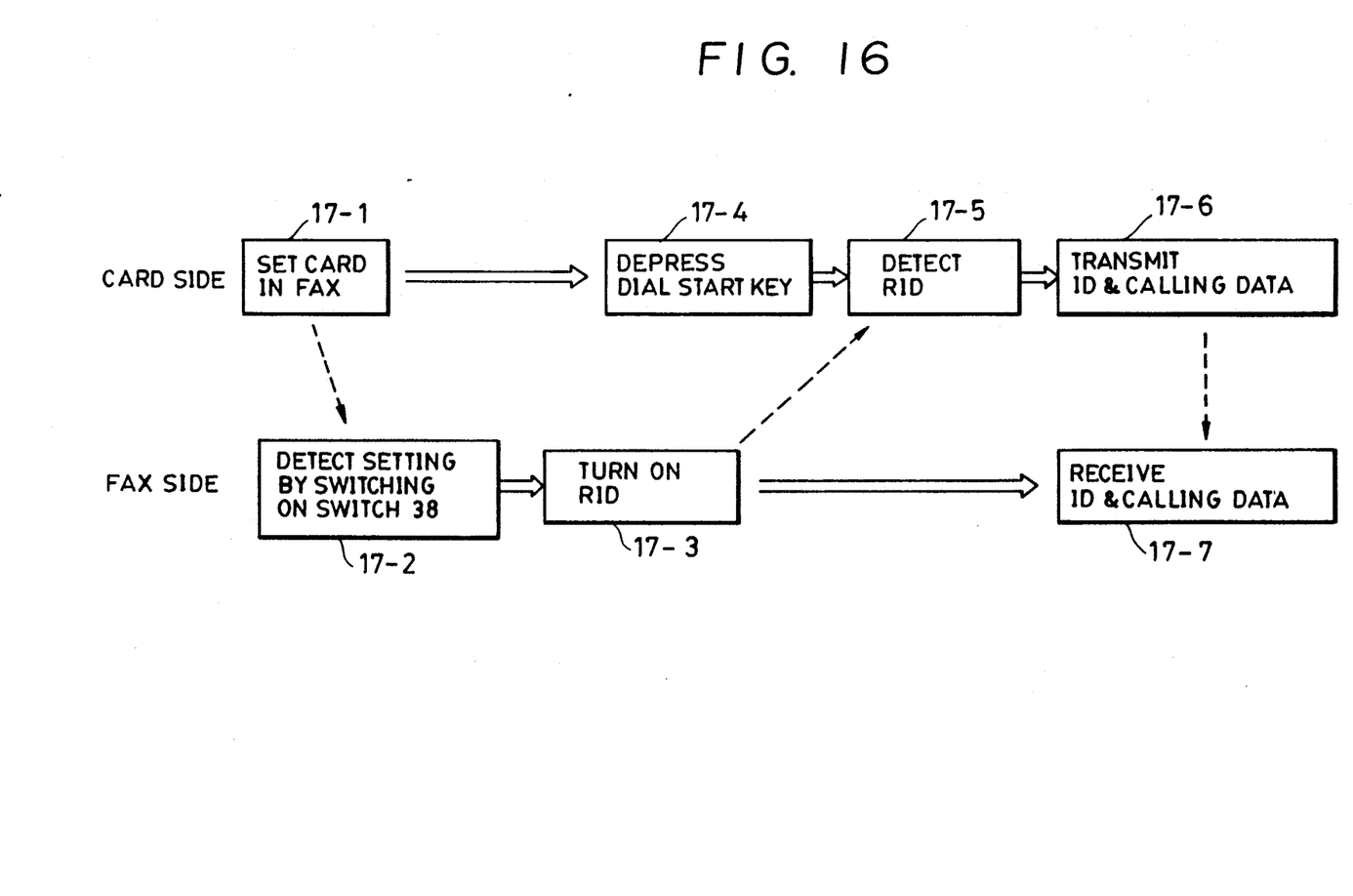
FIG. 16 is a flowchart showing the operation thereof.

FIG. 16 is a flowchart showing the operation of the above-described units when detecting whether or not ID data are needed. When the card 30 is set in the FAX 35 (17-1), the card detection switch 38 is switched on, and FAX 35 detects that the card 30 has been set (17-2). A signal RID for requesting ID data then continues to output (17-3). When the dial start key 2-1 shown in FIG. 6 is depressed (17-4), card 30 detects the RID as explained in step S37 in FIG. 5 (17-5), and transmits ID data and calling data (data, such as the telephone number and name of the correspondent, and the like) to the FAX 35 (17-6). The FAX 35, which has received the data, performs processings, such as call processing, storage of ID data, and the like (17-7).

As described above, by outputting information relating to communication in correspondence with identifying information received from the electronic telephone directory, it is possible to administrate communication for each identifying information.

Although, in the above-described embodiments, communication between the card 30 and the FAX 35 is performed by optical signals, electronic contacts may be provided between the two units to perform communication by electric signals. Furthermore, a PB generator may be provided at the side of the card 30, a PB receiver may be provided in the FAX 35, and communication may be performed by sound signals.

Although an explanation has been provided of a facsimile in the above-described embodiments, the present invention may also be applied to a key telephone system.

In the case of the key telephone system, the card may be set to a dedicated telephone set to perform calling, and administration data may be stored in a memory in a main unit.

When the user wants to see the administration data, the data may be printed out by a printer connected to the main unit, or the data may be displayed one by one on a display unit provided in the dedicated telephone set.

While the present invention has been explained by reference to the preferred embodiments, the present invention is not limited thereto, but various changes and modifications may be made within the scope of the appended claims.

What is claimed is:

1. A communication apparatus comprising:
   connection means for detachably connecting a portable device;
   reception means for receiving communication data including destination data for communication and identification data of the portable device from the portable device connected by said connection means;
   communication means for performing communication according to a set of communication data received from the portable device; and
   record means for continuously recording plural sets of the communication data.

2. A communication apparatus according to claim 1, wherein said communication means performs calling in accordance with the destination data.

3. A communication apparatus according to claim 1, wherein said communication means transmits the identification data.

4. A communication apparatus according to claim 1, wherein said reception means includes photosensing means for receiving optical signals.

5. A communication apparatus according to claim 1, wherein said communication means includes input means for inputting image information, and transmits the input image information.

6. A communication apparatus according to claim 1, wherein said record means continuously records the plural sets of the communication data and communication amount data.

7. A communication apparatus according to claim 6, wherein the communication amount data includes a number of communicated originals.

8. A communication apparatus according to claim 1, wherein said record means comprises an instruction key for instructing said record means to record the plural sets of the communication data.

9. A communication apparatus comprising:
   connection means for detachably connecting a portable device;
   reception means for receiving communication data including destination data for communication and identification data of the portable device from the portable device connected by said connection means;
   communication means for performing communication according to a set of communication data received from the portable device;
   memory means for simultaneously storing plural sets of the communication data; and
   record means for continuously recording the plural sets of the communication data stored in said memory means.

10. A communication apparatus according to claim 9, wherein said communication means performs calling in accordance with the destination data.

11. A communication apparatus according to claim 9, wherein said communication means transmits the identification data.

12. A communication apparatus according to claim 9, wherein said reception means includes photosensing means for receiving optical signals.

13. A communication apparatus according to claim 9, wherein said communication means includes input means for inputting image information, and transmits the input image information.

14. A communication apparatus according to claim 9, wherein said communication means transmits the destination data.

15. A communication apparatus according to claim 9, wherein said memory means stores communication amount data of said communication means corresponding to the communication data, and said record means continuously records the plural sets of the communication data and communication amount data.

16. A communication apparatus according to claim 15, wherein the communication amount data includes a number of communicated originals.

17. A communication apparatus according to claim 9, wherein said record means comprises an instruction key for instructing said record means to record the plural sets of the communication data.

18. A communication apparatus comprising;
   connection means for detachably connecting a portable device;
   photosensing means for receiving optical signals including destination data for communication and identification data of the portable device from the portable device connected by said connection means;
   communication means for performing communication according to the optical signal received from the portable device; and
   record means for recording a communication administration report according to the plural sets of the destination data and the identification data.

19. A communication apparatus according to claim 18, wherein said communication means performs calling in accordance with the destination data.

20. A communication apparatus according to claim 18, wherein said communication means transmits the identification data.

21. A communication apparatus according to claim 18, wherein said communication means transmits the destination data.

22. A communication apparatus according to claim 18, wherein said communication means includes input means for inputting image information, and transmits the input image information.

23. A communication apparatus according to claim 18, wherein said record means continuously records plural sets of the communication data and communication amount data.

24. A communication apparatus according to claim 23, wherein the communication amount data includes a number of communicated originals.

25. A communication apparatus according to claim 18, wherein said record means comprises instruction key for instructing recording of the plural sets of the communication data.

* * * * *